INVENTORS
*Lewis H. White and
Jack L. Roberson*

*Frease & Bishop*
ATTORNEYS

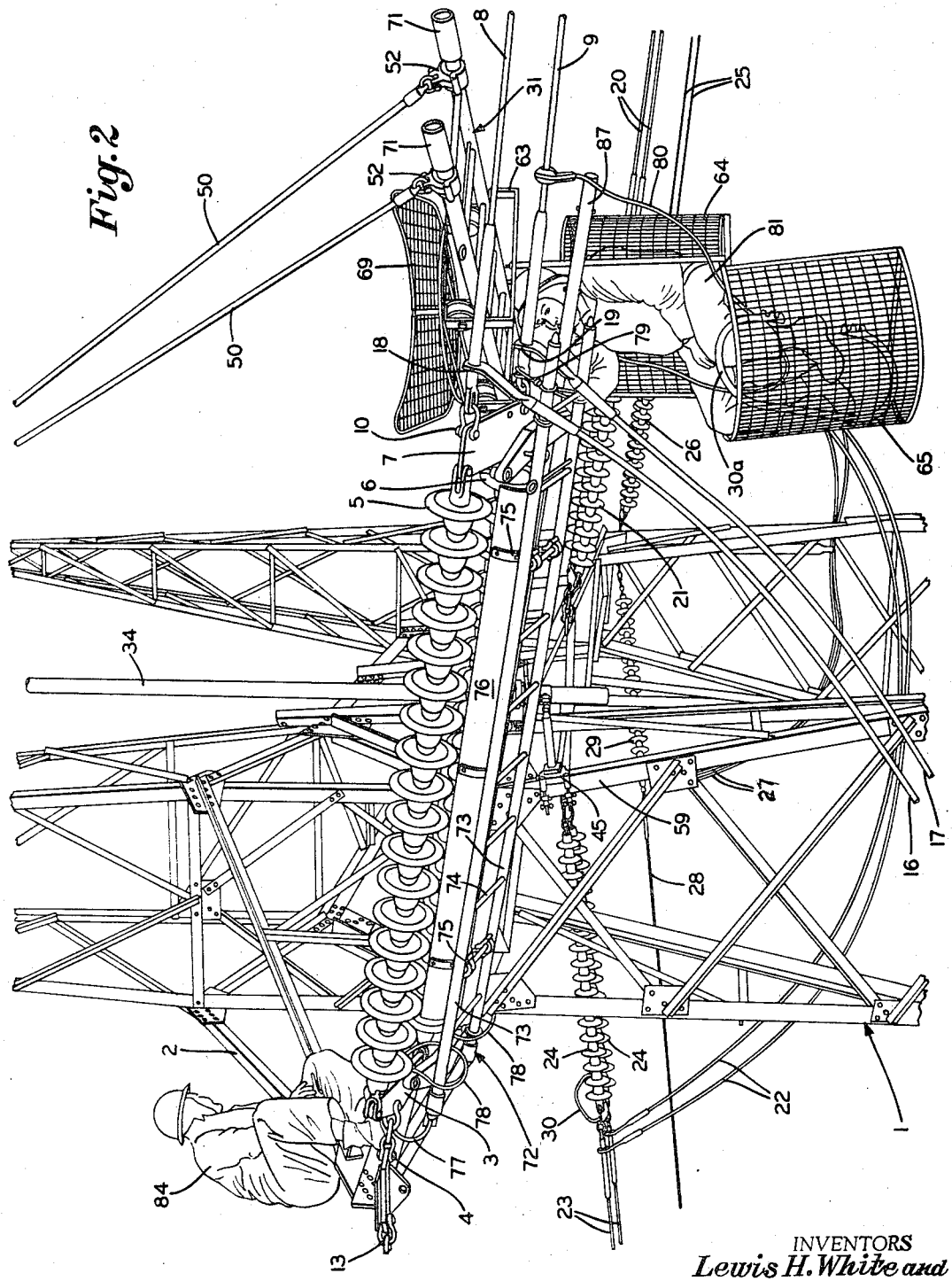

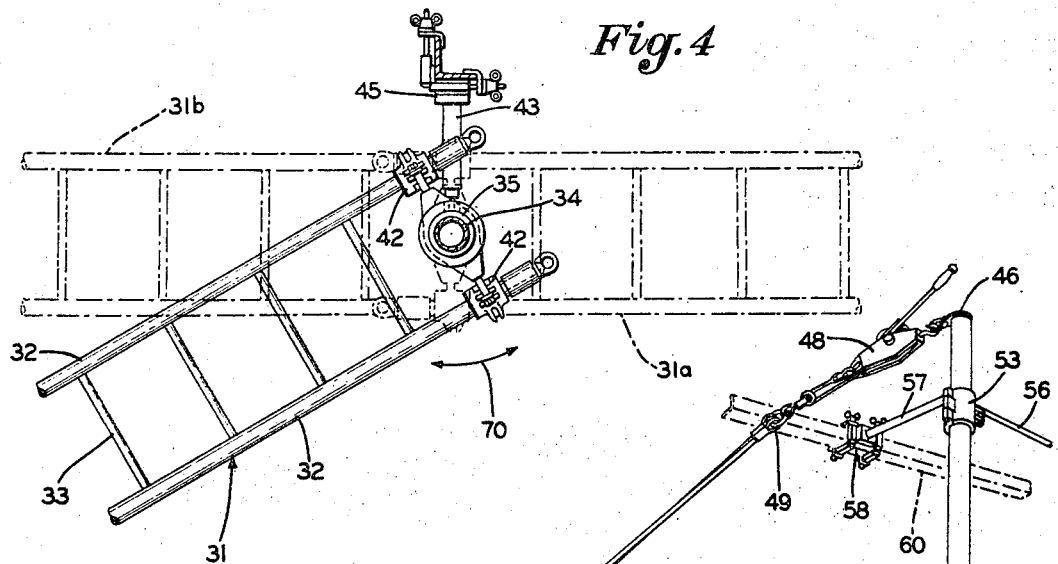
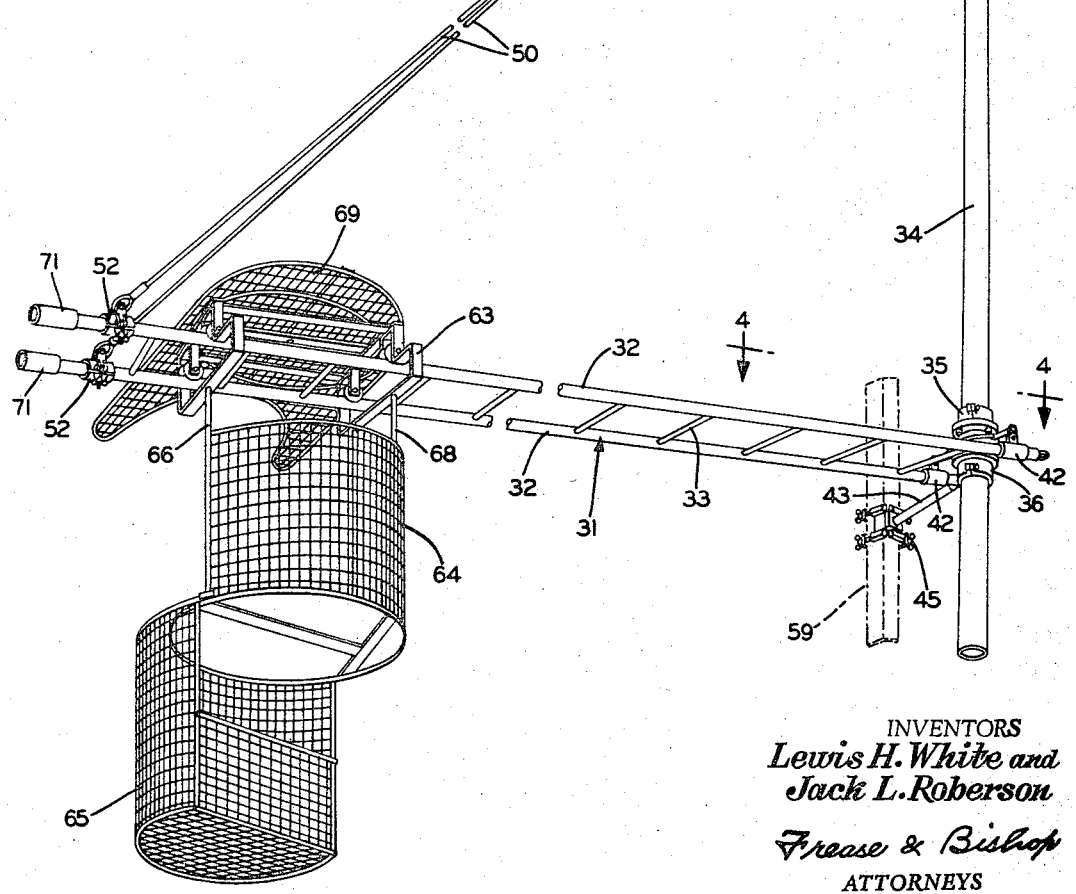

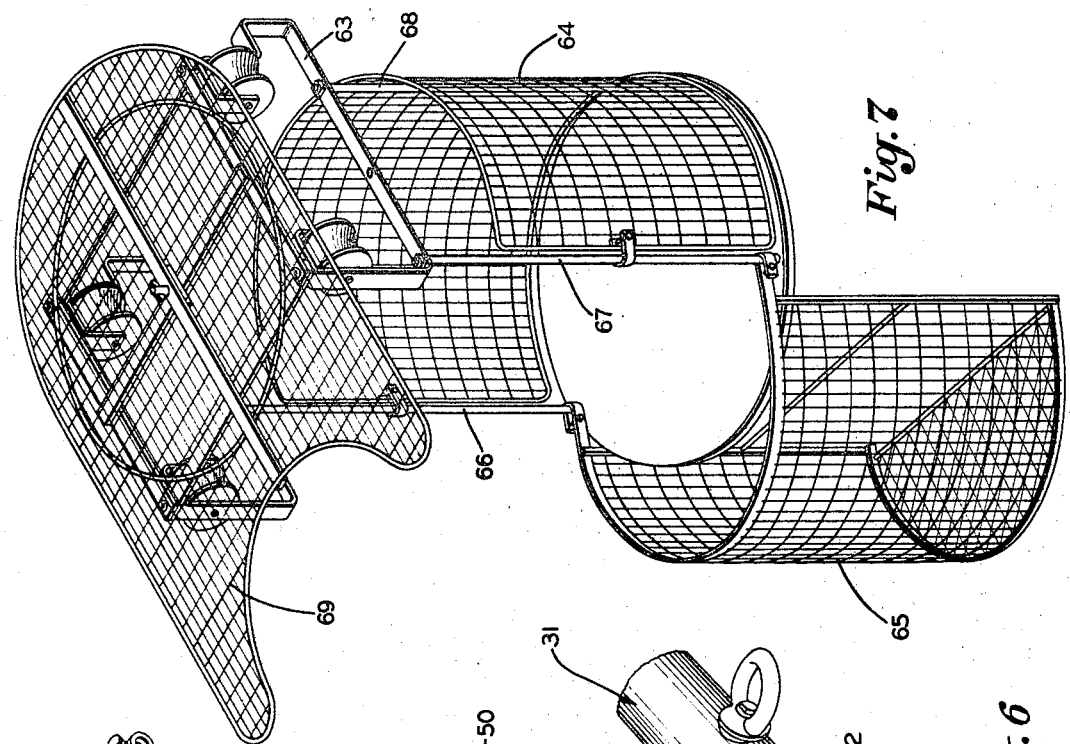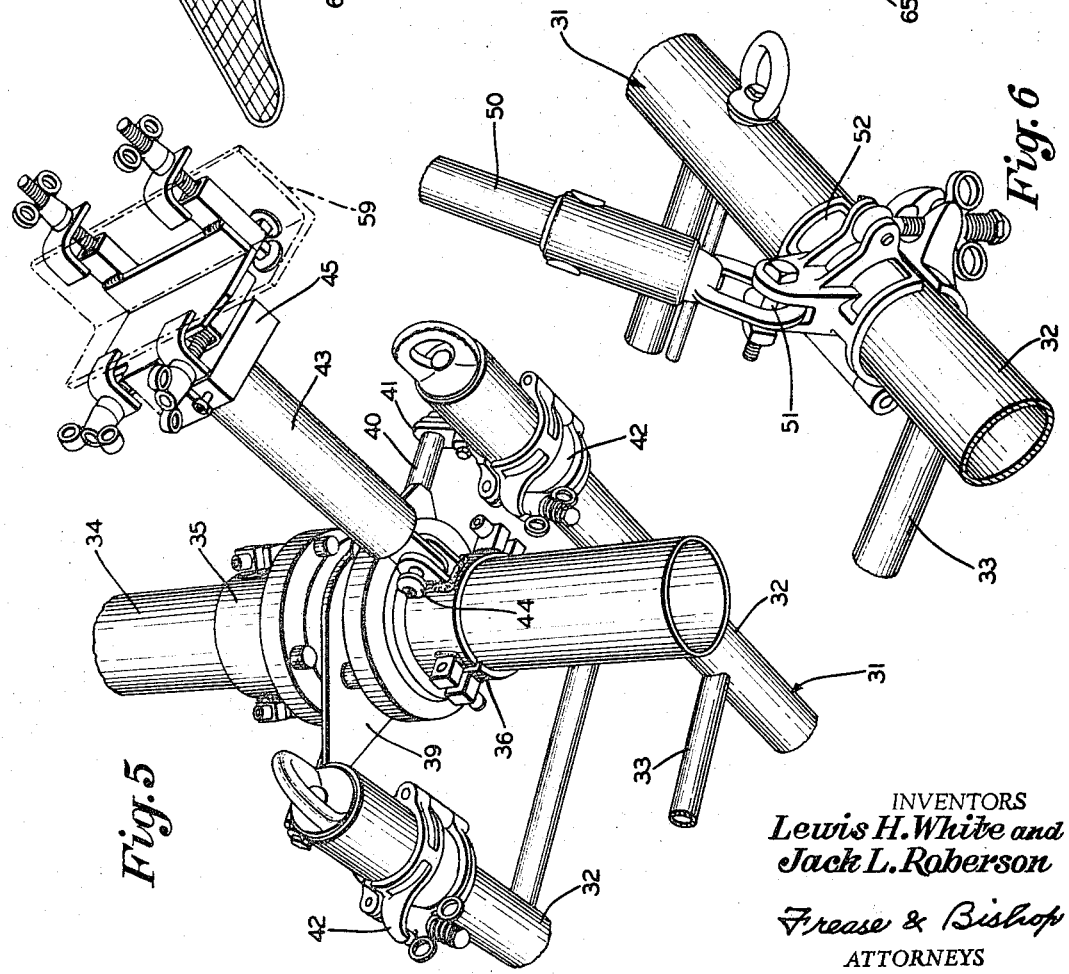

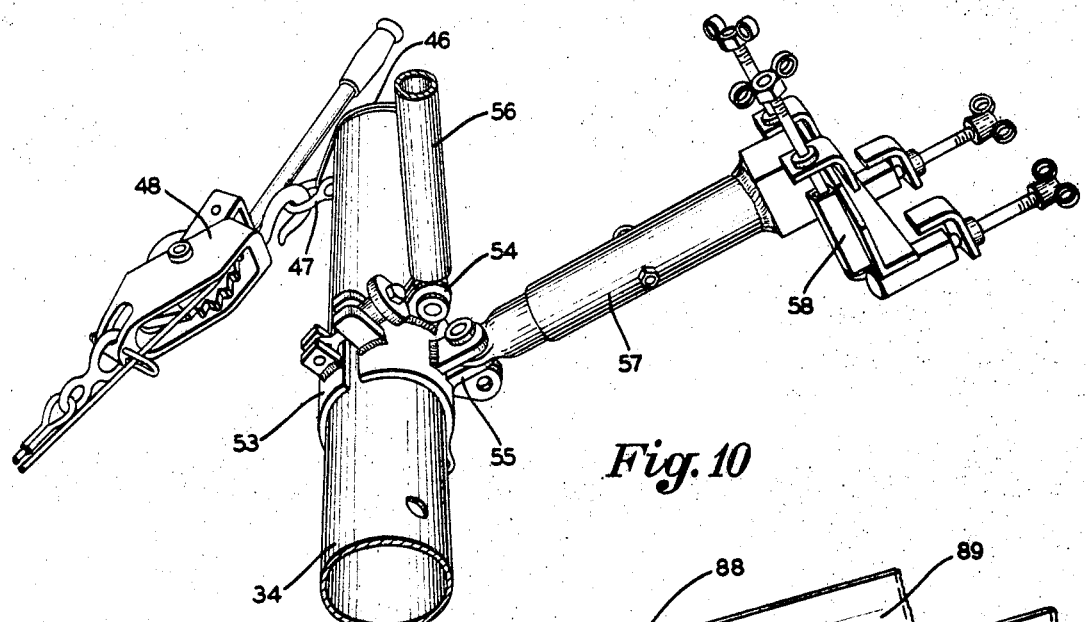
Fig. 10
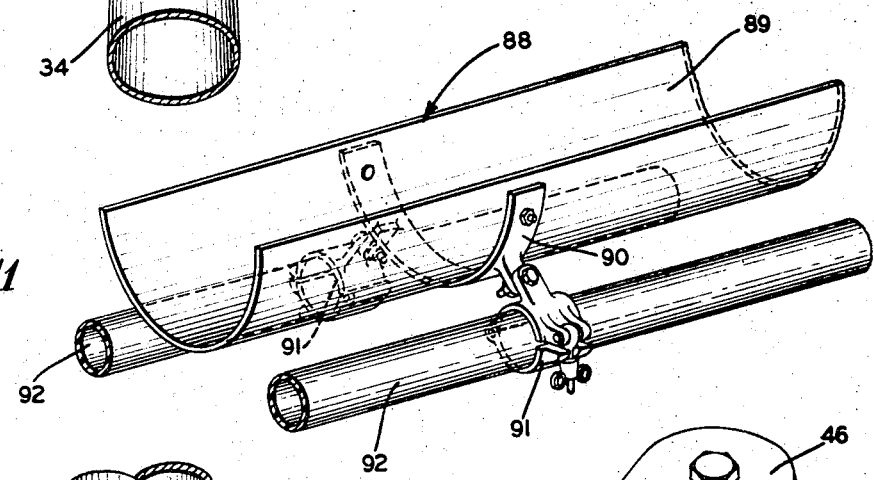
Fig. 11
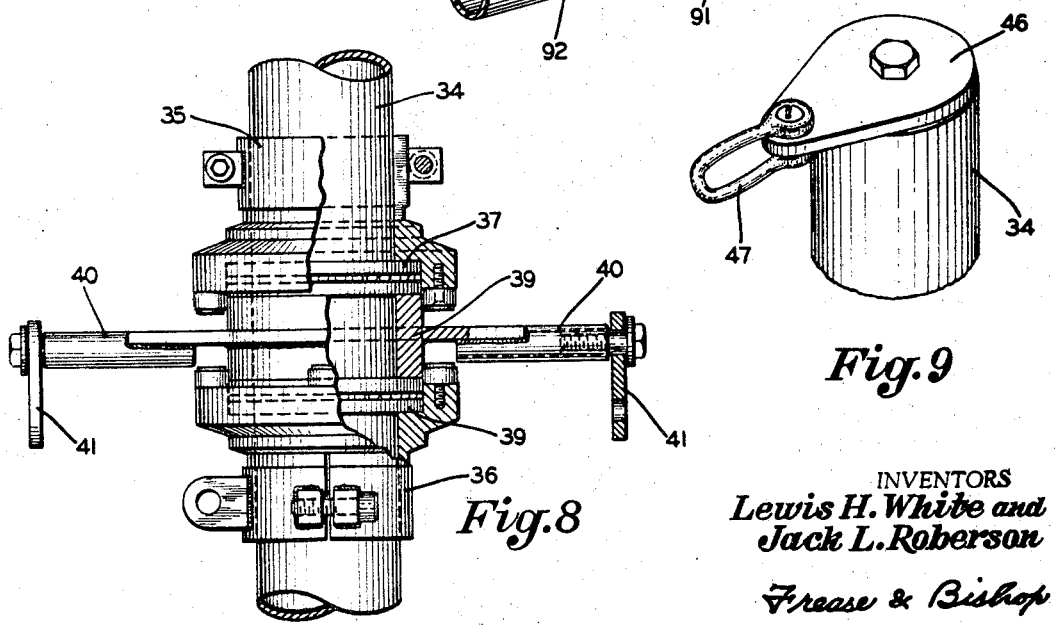
Fig. 8
Fig. 9
INVENTORS
Lewis H. White and
Jack L. Roberson
Frease & Bishop
ATTORNEYS Sept. 24, 1968     L. H. WHITE ET AL     3,402,786
PERSONNEL PROTECTIVE EQUIPMENT FOR WORKING ENERGIZED CONDUCTORS
Filed Oct. 6, 1966     6 Sheets-Sheet 6

INVENTORS
*Lewis H. White and*
*Jack L. Roberson*

*Frease & Bishop*
ATTORNEYS

United States Patent Office 3,402,786
Patented Sept. 24, 1968

3,402,786
PERSONNEL PROTECTIVE EQUIPMENT FOR
WORKING ENERGIZED CONDUCTORS
Lewis H. White, Box 50, West Millgrove, Ohio 43467,
and Jack L. Roberson, Rte. 3, Box 812, Lima, Ohio
45801
Filed Oct. 6, 1966, Ser. No. 584,722
14 Claims. (Cl. 182—46)

ABSTRACT OF THE DISCLOSURE

Protective equipment used at any place or in any type of terrain for maintenance and repair of live-line, high and extra-high voltage power transmission lines permitting protected linemen to work with bare hands and complete freedom in performing live-line maintenance while safely supported from the tower structure on which the transmission lines are supported. A gin pole is adjustably mounted on the tower, supporting an insulating platform for horizontal movement through an arc to position the platform outer end adjacent the live-line insulators being maintained or changed. The lineman rides a trolley along the platform to its outer end, where an insulating cradle may be used, supported from the structure and live-lines, to receive an insulator string for repair or replacement.

---

The invention relates to the maintenance and repair of energized conductors and more particularly to equipment which may be taken into any kind of terrain and used to greatly simplify live-line maintenance of energized extra-high voltage transmission lines and which permits a protected lineman to work with bare hands and with complete freedom on live-lines while safely supported from the structure supporting the transmission lines.

Heretofore, live-line tools and aerial lift trucks combined with bare-hand methods enabled some types of repair on energized lines that had previously required an interruption to service. However, there are limits to the height that can be reached by an aerial boom and to the accessibility of an aerial boom to a work area when high voltage transmission lines operating at say 345 to as high as 750 kv. are involved. Such high voltage transmission lines may extend across rugged terrain inaccessible to an aerial lift truck and the transmission lines are suspended from support towers at heights which cannot be reached by an aerial lift.

The procedure for changing strings of insulators, and particularly deadened suspension insulators has been extremely difficult and time-consuming under conventional procedures and using prior available live-line tools. Such tools are very cumbersome and difficult to handle.

Accordingly, objects of the present invention are to provide improved live-line maintenance equipment which may be mounted on transmission line support structures or towers and used to permit safe bare-hand maintenance operations to be performed by a lineman; to provide equipment which may be safely used to change deadened insulators in situations where such maintenance was heretofore difficult, if not impossible, with the transmission line energized; to provide improved procedures and equipment greatly simplifying live-line maintenance of energized high voltage transmission lines; to provide equipment which protects a lineman working with bare hands from any effects of static charges and enables the lineman to work with complete freedom while safely supported from the support structure; and to provide equipment eliminating difficulties heretofore existing in the art and obtaining the indicated objects in a simple, effective and inexpensive manner, thereby satisfying needs existing in the art.

These and other objects and advantages apparent to those skilled in the art from the following description and claims may be obtained, the stated results achieved, and the described difficulties overcome, by the structures, devices, elements, arrangements, parts, combinations and equipment which comprise the present invention, the nature of which is set forth in the following general statement, preferred embodiments of which—illustrative of the best modes in which applicants have contemplated applying the principles—are set forth in the following description and shown in the drawings, and which are particularly and distinctly pointed out and set forth in the appended claims forming part thereof.

The nature of the improved personnel protective equipment for barehand live-line maintenance of energized conductors suspended by insulators from a support structure may be stated in general terms as including, gin pole means having upper and lower ends, means mounting and positioning and maintaining in vertical position the gin pole means on said support structure, said gin pole mounting means preferably including adjustable bracket means and adjustable clamp means on the bracket means connected to the upper and lower ends of the gin pole means and clamped to said support structure; an insulating material ladder-like platform having inner and outer ends, means mounting the inner end of the platform on the lower end of the gin pole means for rotation of the platform through at least a 180° arc in a horizontal plane, said platform mounting means preferably including a swivel member journaled on the lower end of the gin pole, a horizontal-axis pivot connection between the swivel connector and the inner end of the platform, insulating strut means having upper and lower ends, means pivotally connecting the lower end of the strut means to the outer platform end, adjustable tensioning means connected between the upper end of said strut means and the gin pole upper end, whereby adjustment of said tensioning means positions the platform horizontally and maintains the platform horizontally positioned; trolley frame means movably supported on said insulating platform and movable thereon between the inner and outer platform ends; wire cage means preferably reversibly suspended from said trolley frame means, reversible overhead shield means mounted on the trolley frame means above the wire cage means; insulating trough-like cradle means; and insulating hanger means for suspending said cradle means at one end from live-line energized conductors and at the other end from a support structure for such conductors to position said cradle means beneath insulators suspending such live-line energized conductors from said support structure; whereby a lineman in said cage when moved to an insulating platform outer end located a safe distance away from such energized conductors may be swung in a horizontal plane to a position below such energized conductors, may barehand engage insulating hanger means between an insulating cradle means end and such energized conductors, and may perform barehand maintenance work thereon along with other linemen working barehand on the support structure at the support structure suspended other end of the cradle means.

By way of example, the improved construction is shown in the accompanying drawings forming part hereof in which:

FIG. 2 is a perspective view illustrating a later step in the procedure for changing deadend insulators;

FIG. 3 is a perspective view illustrating an improved aerial cage unit movably mounted on an insulating ladder rotatably supported on a gin pole which is mounted on the tower structure;

FIG. 4 is a fragmentary plan sectional view looking in the direction of the arrows 4—4, FIG. 3, illustrating various positions to which the cage support ladder may be moved;

FIG. 5 is an enlarged fragmentary perspective view of a portion of FIG. 3, illustrating the rotatable swivel mounting of one end of the ladder on the gin pole, and one of the support brackets used to mount the gin pole on the tower structure;

FIG. 6 is a fragmentary perspective view of another portion of FIG. 3, illustrating the manner in which the outer end of one of the ladder legs is supported by a strut connected to the gin pole;

FIG. 7 is a perspective view of the aerial cage unit and its trolley which rides along the legs of the ladder;

FIG. 8 is an enlarged fragmentary side elevation, with parts broken away and in section, illustrating the swivel mounting of one end of the ladder on the gin pole;

FIG. 9 is an enlarged fragmentary perspective view of the top end of the gin pole shown in FIG. 3;

FIG. 10 is a fragmentary perspective view of a portion of FIG. 3, illustrating brackets used to connect the top end of the gin pole to the tower structure, and a tensioning device connected to the struts which support the outer end of the ladder;

FIG. 11 is a fragmentary perspective view showing a modified form of insulator cradle;

Similar numerals refer to similar parts throughout the various figures of the drawings.

Figure 1:
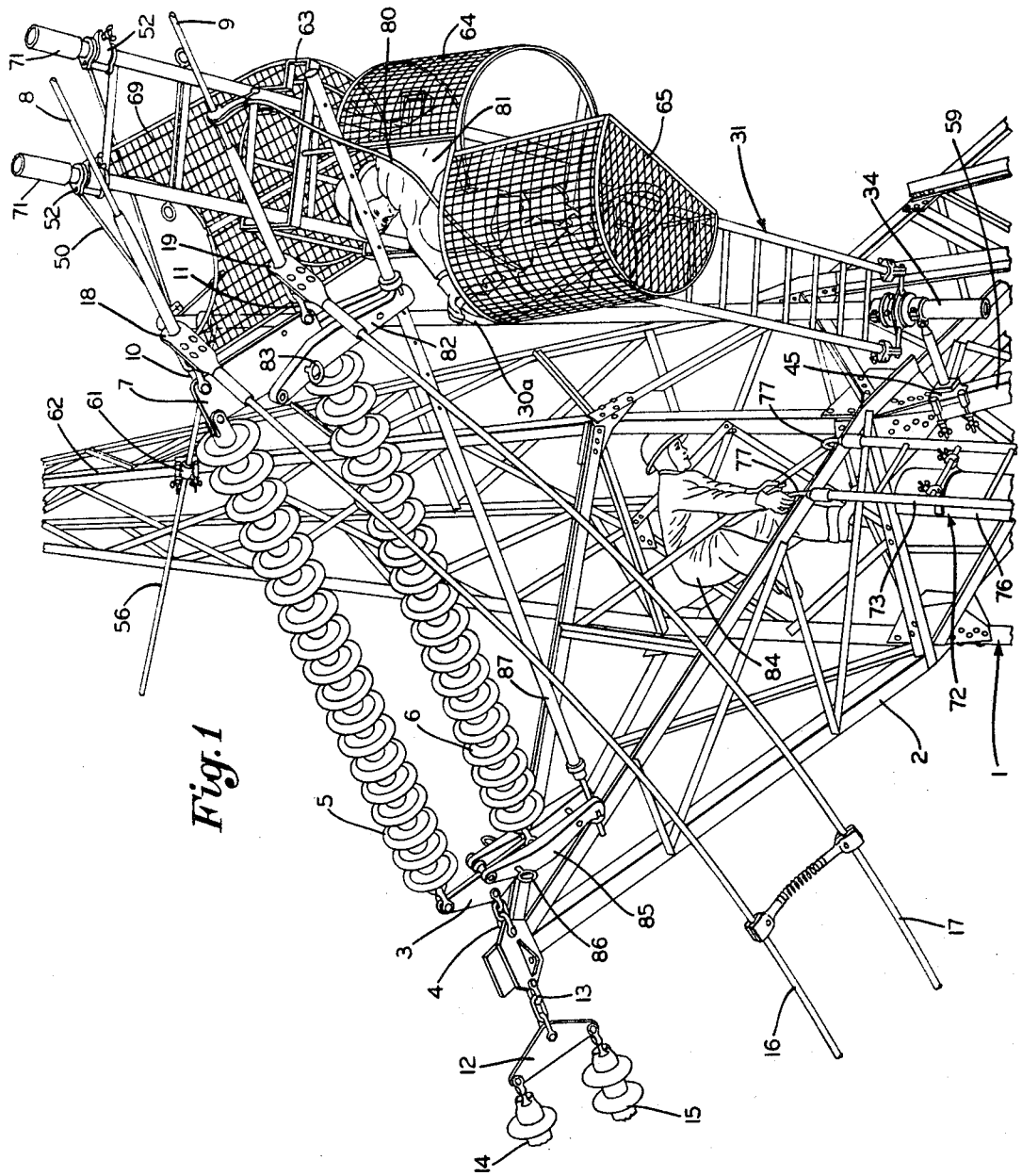
FIGURE 1 is a perspective view illustrating one form of the improved equipment mounted on a transmission line support tower and in use during an early step in the procedure for changing deadend insulators.

A typical steel frame transmission line support tower is indicated generally at 1 in FIGS. 1 and 2 having an usual cross arm structure 2. A rear deadend yoke plate 3 is pivotally connected at 4 to the outer end of cross arm 2. Two strings of insulators 5 and 6 extend to the front deadend yoke plate 7. The ends of live-line wires 8 and 9 are connected at 10 and 11 to the front yoke plate 7, thus suspending live-lines 8 and 9 between tower 1 and the next tower in the power transmission line.

Similarly, a rear deadend yoke plate 12 is pivotally connected at 13 to the outer end of cross arm 2 on which two strings of insulators 14 and 15 are mounted which are connected at their other ends to another forward yoke plate from which another pair of live-line wires is suspended.

Live-line connector wires 16 and 17 are connected at 18 and 19 to the ends of wires 8 and 9; and wires 16 and 17 are similarly connected at their other ends to the pair of transmission line wires suspended from insulator strings 14 and 15.

FIG. 2 illustrates another pair of live-line transmission wires 20 suspended extending in one direction from tower 1 by insulators 21, connected by a pair of connector wires 22 to live-line transmission wires 23 suspended from insulators 24. Similarly, FIG. 2 shows still another pair of live-line transmission wires 25 suspended by insulators 26 from tower 1 which are connected by connector wires 27 to live-line wires 28 suspended by insulators 29.

A corona ring 30 normally is connected to each front dead-end yoke plate adjacent the connection of the live-line wires to the yoke plate, as indicated in FIG. 2 where the corona ring 30 serves the live-line transmission wires 23.

In accordance with the invention, a ladder generally indicated at 31 having legs 32 and rungs 33 all formed of insulating material such as fiber glass, is mounted on a gin pole 34 for rotatable or swivel movement. Upper and lower collars 35 and 36 are clamped to the gin pole which support the bearings 37 and 38 between which a ladder adapter 39 is rotatably mounted. Adapter 39 has horizontally extending arms 40 to the ends of which links 41 are pivotally connected; and the lower ends of links 41 in turn are pivotally connected to pole clamps 42 which are clamped to the ends of the ladder legs 32 at one end as well shown in FIG. 5. A support bracket arm 43 is pivotally connected at 44 to the lower collar 36 and an adjustable clamping bracket 45 is mounted on bracket arm 43.

The upper end of gin pole 34 is provided with a swivel plate 46 on which a clevis 47 is pivotally mounted. A ratchet operated cable hoist 48 is connected to clevis 47 and to the upper ends 49 of a pair of fiber glass struts 50. The lower ends of struts 50 are pivotally connected at 51 to pole clamps 52 mounted on the ladder legs 32 adjacent the outer end of the ladder.

Another pole clamp 53 is mounted on gin pole 34 adjacent its top end (FIG. 10), provided with pairs of lugs 54 and 55 for the connection of a guy pole 56 and an adjustable extension leg 57 having an adjustable clamping bracket 58 at its outer end.

Gin pole 34 is clamped, mounted and supported on tower 1 by securing clamping bracket 45 on bracket arm 43 at the lower end of gin pole 34 to an angle member 59 of tower 1 (FIGS. 1, 2, 3 and 5); also by securing clamping bracket 58 on extension leg 57 at the upper end of gin pole 34 to an angle member 60 of tower 1 (FIGS. 3 and 10); and by securing guy pole 56 at the upper end of gin pole 34 through clamp 61 to another angle member 62 of tower 1 (FIGS. 1 and 3).

Ladder 31 rotatably mounted by adapter 39 at the lower end of gin pole 34 serves as an insulating platform. Gin pole 34 must be maintained in a true vertical position so that the ladder-platform 31 can swing, swivel or rotate horizontally. Struts 50 which support the outer end of the ladder-platform 31 being of fiber glass also maintain the insulated condition of platform 31.

Ratchet chain hoist 48 may be tightened to establish such tension on struts 50 as is necessary to support the outer end of platform 31 in a horizontal plane. Adjustments of the guy pole 56, bracket arm 43, adjustable leg 57 and clamping brackets 45, 58 and 61 enable the gin pole 34 to be erected, positioned and supported on tower 1 in a truly vertical position.

A four-wheeled trolley truck or frame 63 is supported on and rides on legs 32 of ladder 31 for travel between gin pole 34 at one end of ladder 31 and the outer end of ladder 31 adjacent strut clamps 52. A wire cage 64 having a movable leg protector cage portion 65 is suspended from trolley truck 63 on three legs 66, 67 and 68 (FIG. 7). Cage 64 is reversible by attaching the two legs 67 and 68 to the rear of trolley frame 63 rather than to the front as shown in FIG. 7, and by attaching leg 66 to the front of frame 63 rather than to the rear as shown. This permits a workman to work either from the left or right side of trolley truck 63.

A rotating overhead shield 69 is attached to trolley frame 63 above ladder 31, and shield 69 may be rotated to the required position depending upon the position of cage 64.

Ladder 31 maintained in a horizontal position may be swung, swiveled, pivoted or rotated through an angle of at least 180° laterally, as indicated by the arrow 70 in FIG. 4 and by the dot-dash ladder positions 31a and 31b illustrated. Ladder 31 preferably is equipped with extension fittings 71 to which another similar fiber glass ladder may be connected if desired to extend the length of ladder 31. If a further extension ladder is used, clamps 52 are moved to the outer ends of the legs of the extension ladder and the pair of fiber glass struts 50 are extended. Fiber glass ladders of the type shown have considerable strength in tension and bending when employed in the manner shown.

The various brackets, clamps and the length of ladder 31 must be adjustable as indicated. The clamps must fit different size structural angles, which in turn, may be at quite different angles to the vertical. That is, the available points for support of gin pole 34 on tower 1 may vary considerably and the means provided for mounting the gin pole 34 on tower 1, or fundamentally for mounting insulating platform 31 for rotation in a horizontal plane on tower 1 must be adjustable.

Cradle means generally indicated at 72 (FIGS. 1 and 2) also is used in replacing deadend insulators. Cradle means 72 may comprise a fiber glass insulation ladder having legs 73 and rungs 74. Brackets 75 mounted on rungs 74 support a trough section of a hollow cylinder 76 preferably formed of fiber glass but which may be made of any non-absorbent insulating material. Cradle means 72 may be provided with hooks 77 used for manipulating the cradle 72 as shown in FIG. 1, or for supporting one end of cradle 72 on rear deadend yoke plate 3 as shown in FIG. 2. Polypropylene ropes 78 also may be used to support one end of cradle 72 from yoke plate 3. The other end of cradle 72 may be supported by polypropylene ropes tied at 79 to the live end of conductor 9 (FIG. 2).

The new equipment and procedure is particularly advantageous in use for changing strings of deadend suspension insulators as illustrated in FIGS. 1 and 2. This is a task that formerly has been extremely difficult and time-consuming to carry out by conventional methods. Gin pole 34, ladder 31, struts 50, trolley 63 and cage 64 are located, mounted and supported at a suitable location on tower 1 with gin pole 34 extending vertically so that ladder 31 may swing in a horizontal plane. The ladder 31 is located in a position, spaced from and parallel with conductors 8 and 9. A lineman 81 may enter cage 64 when the cage is located adjacent gin pole 34 and may then roll the cage to the far end of ladder 31 to a position such as shown in FIG. 3.

Lineman 81 may then approach the energized conductors 8 and 9 by a companion lineman 84 rotating the ladder 31 from the position parallel to the conductors to a working position such as shown in FIG. 1. In this position lineman 81 may use an insulated reach bar to attach a jumper or bonding strap 80 to one of the energized conductors 9, as shown, which bonds the cage 64 to the energized conductor 9. This establishes the cage and lineman 81 in the cage 64 with the same potential as the energized conductor 9. In this position ladder legs 32 are directly above conductors 8 and 9 and the insulators 5 and 6 are within easy reach of lineman 81 in cage 64. Also, lineman 81 is shielded by cage 64, leg protector portion 65 and overhead shield 69.

Lineman 81 may then remove the corona ring 30a from the front deadend yoke plate 7 and place it in cage portion 65 (FIG. 1), and then may attach live-line deadend yoke 82 by pin 83 to front yoke plate 7 as shown in FIG. 1. Meanwhile, companion lineman 84 working on tower 1 at ground potential may attach yoke 85 to rear deadend yoke plate 83 by pin 86. An insulating jack stick 87 then is connected to yokes 82 and 85 by linemen 81 and 84, as shown in FIG. 1.

Meanwhile, lineman 84 (FIG. 1) having been supplied with cradle 72 and working with lineman 81 may install cradle 72 in the position shown in FIG. 2 with trough 76 beneath the string of insulators 6.

Jack stick 87 then is actuated to take up conductor tension between deadend yoke plates 3 and 7, to thus relieve tension on the string of insulators 6. The string of insulators 6 then rest in the insulated cradle trough 76 where the insulators may be uncoupled and slid along cradle trough 76 to lineman 84 (FIG. 2) on the tower arm where replacement of defective insulators may be made. In the alternative, the insulators may be lowered to the ground for replacement.

After replacement, jack stick 87 is actuated to reestablish tension on the repaired insulator strings 6. Yokes 85 and 82 and jack stick 87 then may be installed to relieve tension on the insulator string 5 for replacement thereof in the same manner.

Replacement of the deadend insulators in the manner described involves barehand activity on the part of the linemen and combines the use of live-line tools and equipment and the barehand method. The procedure for replacing insulators is applicable to all of the higher transmission voltages, it can be used on either steel or wood structures, and can be used at locations inaccessible to an aerial lift. The new equipment simplifies the replacement of all transmission line insulators and may be used for changing tangent, V-string and deadends.

Long strings of deadend insulators mounted horizontally as shown in FIGS. 1 and 2 are under considerable tension due to their weight, even when relieved of line tension. Such insulators can only be uncoupled when their weight is supported in a manner that completely relieves the tension at both ends of the string. In former practice, relieving the tension usually was accomplished by mounting a gin and boom on the tower arm and lifting the insulators by means of rails supported on the boom so that the string could be uncoupled. This method was extremely cumbersome, very time-consuming, and left much to be desired.

Use of the new equipment and procedure which combines the use of live-line tools and the barehand method enables linemen to work from much more relaxed positions and with much more ease than was heretofore possible. The procedure may be carried out much faster and easier than attempting to install lift sticks, to remove keys, pins and spring washers from a considerable distance using insulated tools on the ends of long flexible sticks that are heavy and difficult to maneuver. Actually, the new equipment enables deadend insulators to be changed in situations where maintenance heretofore was difficult, if not impossible, with the line energized.

Thus, the new equipment permits an entirely new and greatly simplified procedure to be carried out for changing insulators on high voltage transmission lines.

FIG. 11 illustrates a modified form of cradle means 88 in which the insulating trough member 89 is mounted by brackets 90 with clamps 91 directly into tubular bars 92 of insulation material. In other words, although the trough member 89 may be mounted on an insulating ladder structure, a ladder structure is not necessarily required since the insulating tubes 92 satisfy all requirements.

Figure 12:
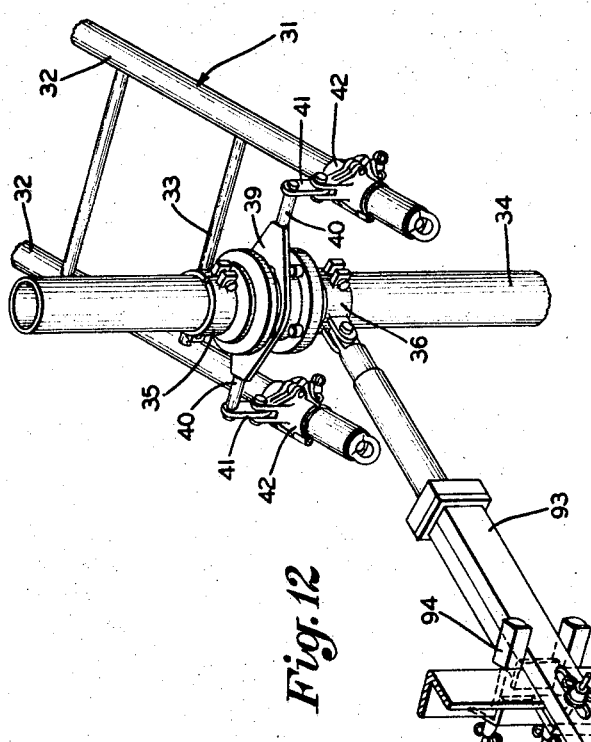
FIG. 12 is a fragmentary perspective view showing a modified form of gin pole bracket clamp which may be used to mount a gin pole on a triangular tower structure.
Figure 13:
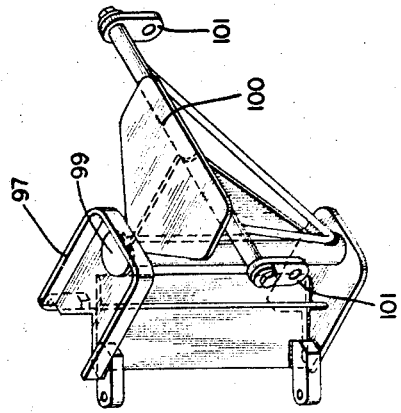
FIG. 13 is a perspective view illustrating a ladder support bracket which may be used to pivotally support one end of a ladder on a simple wooden or metal pole.

FIG. 12 illustrates a modified form of bracket 93 and clamps 94 which may be substituted for the bracket 43 and clamp 45 (FIG. 5) when the gin pole 34 is to be mounted on a triangular pole or tower 95.

Figure 14:
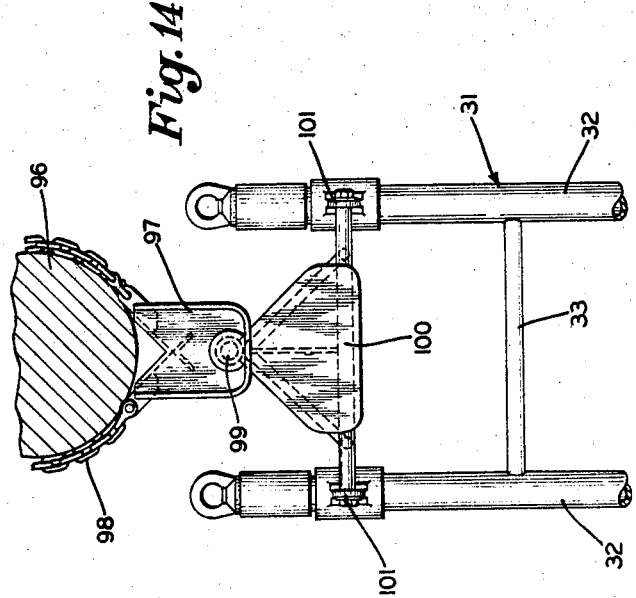
FIG. 14 is a fragmentary plan view illustrating the support bracket of FIG. 13 mounting an end of the ladder on a pole structure.

In the event that ladder-platform 31 is supported on a typical wooden or metal pole indicated at 96 in FIG. 14, a bracket 97 may be clamped on pole 96 by a chain clamp 98 and a vertical pivot pin 99 carried by bracket 97 is used to support a bracket arm 100 for rotation on a vertical axis. Links 101 may be used to suspend one end of ladder 31 from the bracket arm 100, thus mounting the insulating ladder-platform 31 for rotation in a horizontal plane on pole 96.

Accordingly, the present invention provides an improved construction and procedure by which bare-hand maintenance operations may be performed by linemen on high voltage transmission lines while energized; provides for carrying out maintenance operations which heretofore was difficult, if not impossible, to perform; provides improved procedures and equipment greatly simplifying live-line maintenance of energized high voltage transmission lines; and provides equipment which in use eliminates difficulties that existed in the art and which solves problems and satisfies existing needs in the art.

In the foregoing description certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details, sizes, etc., shown or described.

Having now described the features, discoveries and principles of the invention, the manner in which the improved equipment is constructed and used, the new procedures which may be carried out, and the advantageous, new and useful results obtained thereby; the new and useful structures, devices, elements, arrangements, parts, combinations, equipment and mechanical equivalents obvious to those skilled in the art are set forth in the appended claims.

We claim:

1. In personnel protective equipment for barehand live-line maintenance of energized conductors suspended by insulators from a support structure, the combination of gin pole means having upper and lower ends, means mounting and positioning the gin pole means in vertical position on said support structure; an insulating platform having inner and outer ends, means rotatably mounting the inner platform end on the lower gin pole end for platform rotation in a horizontal plane around the gin pole; insulating strut means connecting the outer platform end and the upper gin pole end, said strut means including adjustable tensioning means for positioning the platform horizontally and for maintaining the platform horizontally positioned; trolley frame means movably supported on said insulating platform and movable thereon between the inner and outer platform ends; wire cage means suspended from said trolley frame means; insulating trough-like cradle means for receiving insulators connected with conductors on which maintenance is to be performed, said cradle means having conductor and support ends; and insulating hanger means connected to the cradle means ends and engageable with live-line energized conductors to suspend the cradle means conductor end from such energized conductors, and engageable with the support structure for such energized conductors to suspend the cradle means support end from such support structure; whereby said cradle means may be positioned beneath insulators which suspend such conductors from said support structure to permit barehand live-line maintenance work by linemen in said cage and on said support structure.

2. Personnel protective equipment as defined in claim 1 in which the gin pole mounting means includes adjustable bracket means and adjustable clamp means on the bracket means connected to the upper and lower ends of the gin pole means and clamped to a support structure to position the gin pole means in vertical position on the support structure.

3. Personnel protective equipment as defined in claim 1 in which the insulating platform is constructed ladder-like with insulating material legs extending between the inner and outer platform ends and with insulating material rungs connected at spaced intervals between the legs.

4. Personnel protective equipment as defined in claim 1 in which the means rotatably mounting the inner platform end on the lower gin pole end includes a swivel member journaled on the lower gin pole end and pivot means connecting the swivel member and the inner platform end, and in which the platform is rotatable through at least a 180° arc in a horizontal plane around the gin pole.

5. Personnel protective equipment as defined in claim 1 in which the insulating strut means connecting the outer platform end and the upper gin pole end includes ratchet chain hoist tensioning means and insulating strut members having upper and lower ends, in which the strut members are pivotally connected at their lower ends to the outer end of the platform, and in which the tensioning means is connected between the upper ends of the strut members and the upper end of the gin pole.

6. Personnel protective equipment as defined in claim 1 in which the insulating platform is constructed ladderlike with insulating material legs extending between the inner and outer platform ends and with insulating material rungs connected at spaced intervals between the legs, and in which the trolley frame means has wheels which ride on the platform legs.

7. Personnel protective equipment as defined in claim 1 in which the wire cage means is provided with a movable leg protector cage portion movable to open a portion of the cage to provide a work opening through which a lineman in the cage may perform barehand maintenance operations, and in which the wire cage means suspension from the trolley frame means is reversible to permit the cage opening to be presented from either side of the platform on which the trolley frame means is movably supported.

8. Personnel protective equipment as defined in claim 7 in which the wire cage means includes an overhead shield mounted on the trolley frame above the platform, and in which the overhead shield is reversible corresponding to the reversible mounting of the cage means on the trolley means.

9. Personnel protective equipment as defined in claim 1 in which the insulating cradle means includes spaced insulating material legs and an insulating material trough-like member mounted on the legs.

10. Personnel protective equipment as defined in claim 1 in which the insulating hanger means comprises insulating material ropes tied between one end of the cradle means and energized conductors, and tied between the other end of the cradle means and the conductor support structure to position the cradle means beneath insulators suspending the conductors from the support structure.

11. In personnel protective equipment for barehand live-line maintenance of energized conductors suspended by insulators from a support structure, the combination of an insulating platform having inner and outer ends, means rotatably mounting the inner platform end on said support structure for rotation on a vertical axis in a horizontal plane; insulating strut means supporting the outer platform end from the support structure, said strut means including adjustable tensioning means for positioning the platform horizontally and for maintaining the platform horizontally positioned; trolley frame means movably supported on said insulating platform and movable thereon between the inner and outer platform ends; and wire cage means suspended from said trolley frame means.

12. Personnel protective equipment as defined in claim 11 in which the means rotatably mounting the inner platform end on the support structure includes a gin pole, means mounting and positioning the gin pole in vertical position on the support structure, bearing means at the lower end of the gin pole, a swivel member rotatably journaled on the gin pole by said bearing means, and means pivotally connecting the inner end of the insulating platform to said swivel connector.

13. Personnel protective equipment as defined in claim 11 in which the means rotatably mounting the inner platform end on the support structure includes a bracket clamped to the support structure, vertically extending pivot means mounted on the bracket, a bracket arm rotatable on said pivot means on a vertical axis, and means pivotally supporting the inner end of the platform on said bracket arm.

14. In a method of performing barehand live-line maintenance operations on an energized conductor suspended by a string of insulators from a support structure;

the steps of supporting a wire cage and a lineman in the cage spaced from an energized conductor on a horizontally movable insulated platform mounted on a support structure for said energized conductor; moving the cage and linemen in the cage in a path spaced from and generally parallel with said conductor to a zone spaced from said support structure; swinging the cage and linemen to a working position below said conductor; bonding the cage to said conductor; installing an insulated jack-stick between the support structure and conductor mounting means for a string of insulators to be repaired; suspending an insulated cradle from said support structure and conductor beneath the conductor-suspending string of insulators to be repaired; releasing line tension on the string of insulators to permit the insulators to rest in the cradle; uncoupling the insulators while resting in said cradle; and replacing desired insulators in the string; whereby the jack-stick installation, cradle suspension, and insulator tension relieving, uncoupling and replacement may be performed barehand by the linemen.

References Cited
UNITED STATES PATENTS

| | | | |
|---|---|---|---|
| 1,026,380 | 5/1912 | Brooks | 182—46 |
| 2,582,528 | 1/1952 | Cranford | 182—222 |
| 3,158,224 | 11/1964 | Van Name et al. | 182—46 |
| 3,061,041 | 10/1962 | Taylor | 182—129 |
| 3,196,980 | 7/1965 | Rorden | 182—46 |

REINALDO P. MACHADO, *Primary Examiner.*